US012757117B2

(12) United States Patent
Fu

(10) Patent No.: US 12,757,117 B2
(45) Date of Patent: Oct. 6, 2026

(54) METHOD FOR DETERMINING PAGING OCCASION, METHOD FOR DETERMINING WAKE UP SIGNAL, AND DEVICE

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 242 days.

(21) Appl. No.: 18/840,481

(22) PCT Filed: Feb. 23, 2022

(86) PCT No.: PCT/CN2022/077484

§ 371 (c)(1),
(2) Date: Aug. 21, 2024

(87) PCT Pub. No.: WO2023/159396

PCT Pub. Date: Aug. 31, 2023

(65) Prior Publication Data

US 2025/0168771 A1 May 22, 2025

(51) Int. Cl.
*H04W 52/02* (2009.01)
*H04W 68/02* (2009.01)

(52) U.S. Cl.
CPC ... *H04W 52/0235* (2013.01); *H04W 52/0219* (2013.01); *H04W 68/02* (2013.01)

(58) Field of Classification Search
CPC ......... H04W 52/0235; H04W 52/0219; H04W 68/02; H04W 52/0216; H04W 52/0229; H04W 68/005; H04W 52/02; H04W 76/27; Y02D 30/70
USPC ........................................................ 370/311
See application file for complete search history.

(56) References Cited

U.S. PATENT DOCUMENTS 11,683,785 B2 * 6/2023 Lee ..................... H04W 68/005
370/329
11,924,763 B2 * 3/2024 Höglund et al. .. H04W 52/0235
11,950,206 B2 * 4/2024 Wigard ............. H04W 52/0229
12,022,432 B2 * 6/2024 He ........................ H04W 68/02
12,114,287 B2 * 10/2024 Xu .......................... H04L 5/005
2020/0367194 A1 * 11/2020 Berggren et al. ... H04W 68/005
(Continued)

FOREIGN PATENT DOCUMENTS

CA 3111154 C * 1/2024 ........... H04L 5/0048
CN 110536382 A 12/2019
CN 110972237 A 4/2020
(Continued)

OTHER PUBLICATIONS

ISA State Intellectual Property Office of the People's Republic of China, International Search Report issued in Application No. PCT/CN2022/077484, dated Nov. 10, 2022, 4 pages.
(Continued)

*Primary Examiner* — Mahendra R Patel
(74) *Attorney, Agent, or Firm* — Finnegan, Henderson, Farabow, Garrett & Dunner, L.L.P.

(57) ABSTRACT

A method for determining a paging occasion is performed by a user equipment. The method includes: determining first information carried by a wake up signal, the first information including information indicating an index of a paging occasion corresponding to the wake up signal.

15 Claims, 3 Drawing Sheets

(56) References Cited

U.S. PATENT DOCUMENTS

2021/0250899 A1* 8/2021 Liu ........................ H04W 16/14

FOREIGN PATENT DOCUMENTS

| | | | | | |
|---|---|---|---|---|---|
| CN | 112602356 | A | | 4/2021 | |
| CN | 113170413 | A | * | 7/2021 | ............ H04W 72/51 |
| CN | 116235574 | B | * | 9/2025 | .......... H04W 68/005 |
| KR | 20210157262 | A | | 12/2021 | |
| WO | WO 2019/101539 | A1 | | 5/2019 | |
| WO | 2020143050 | A1 | | 7/2020 | |
| WO | 2021091457 | A1 | | 5/2021 | |
| WO | 2022000181 | A1 | | 1/2022 | |
| WO | WO-2022066599 | A1 | * | 3/2022 | ............ H04W 72/23 |

OTHER PUBLICATIONS

European Patent Office, Extended European Search Report Issued in Application No. 22927687.8, Aug. 29, 2025, 11 pages.

ISA State Intellectual Property Office of the People's Republic of China, Written Opinion of the International Searching Authority Issued in Application No. PCT/CN2022/077484, Nov. 10, 2022, WIPO, 7 pages.

State Intellectual Property Office of the People's Republic of China, Office Action and Search Report Issued in Application No. 2022800031727, Aug. 27, 2025, 16 pages.

ZTE, "Discussion on Multi-cell PDSCH Scheduling via a Single DCI", R1-2104341, 3GPP TSG RAN WG1 #105-e, e-Meeting, May 10-27, 2021, 18 pages.

Moderator (Lenovo), "Feature lead summary #1 on multi-cell PUSCH/PDSCH scheduling with a single DCI", R1-2205234, 3GPP TSG RAN WG1 Meeting #109-e, e-Meeting, May 9-20, 2022, 72 pages.

Lenovo,"Discussion on multi-cell scheduling via a single DCI", R1-2203706, 3GPP TSG RAN WG1 #109-e, E-meeting, May 9-20, 2022, 9 pages.

ISA State Intellectual Property Office of the People's Republic of China, Written Opinion of the International Searching Authority Issued in Application No. PCT/CN2022/118228, Nov. 30, 2022, WIPO, 7 pages.

State Intellectual Property Office of the People's Republic of China, Office Action and Search Report Issued in Application No. 202280000497.X, Apr. 28, 2026, 12 pages.

3GPP TS 36.304 V16.5.0 (Sep. 2021), 3rd Generation Partnership Project; Technical Specification Group Radio Access Network; Evolved Universal Terrestrial Radio Access (E-UTRA); User Equipment (UE) procedures in idle mode (Release 16), Sep. 28, 2021, 64 pages.

* cited by examiner

METHOD FOR DETERMINING PAGING OCCASION, METHOD FOR DETERMINING WAKE UP SIGNAL, AND DEVICE

CROSS REFERENCE TO RELATED APPLICATIONS

The present application is a U.S. National Stage of International Application No. PCT/CN2022/077484 filed on Feb. 23, 2022, the content of which is incorporated herein by reference in its entirety.

TECHNICAL FIELD

The present disclosure relates to the field of wireless communications, and more particularly, to a method for determining a paging occasion, a method for determining a wake up signal, and a device.

BACKGROUND

A low power (LP) consumption wake up signal (WUS) studied by Release-18 (R18) can be used to save energy in an idle state. A user equipment (UE) needs to monitor a WUS before a corresponding paging occasion (PO) and determines whether to perform the PO monitoring according to indication of the WUS. From the viewpoint of a network, in order to save resources occupied by sending WUS, one WUS can be made to correspond to a plurality of consecutive POs where the plurality of POs may correspond to different UE groups. Thus, only one WUS needs to be sent for the plurality of POs.

SUMMARY

According to a first aspect of the present disclosure, there is provided a method for determining a paging occasion, performed by a user equipment, including:

determining first information carried by a wake up signal, the first information including information indicating an index of a paging occasion corresponding to the wake up signal.

According to a second aspect of the present disclosure, there is provided a mobile terminal including:

a processor; and a memory, for storing processor-executable instructions;

wherein the processor is configured to: determine first information carried by the wake up signal, the first information comprising information indicating an index of a paging occasion corresponding to the wake up signal.

According to a third aspect of the present disclosure, there is provided a method for determining a wake up signal, performed by a network equipment, including: determining first information carried by the wake up signal sequence, the first information including information indicating an index of a paging occasion corresponding to the wake up signal.

It is to be understood that both the foregoing general description and the following detailed description are for example and explanation only and are not to restrict the present disclosure.

BRIEF DESCRIPTION OF DRAWINGS

The accompanying drawings, which are included to provide a further understanding of the embodiments of the disclosure and are incorporated in and constitute a part of this application, illustrate embodiments of the disclosure and together with the description serve to explain the embodiments of the disclosure and do not constitute an undue limitation on the embodiments of the disclosure. In the drawings.

DETAILED DESCRIPTION

Reference will now be made in detail to the embodiments of the present disclosure, examples of which are illustrated in the accompanying drawings and detailed description.

Reference will now be made in detail to embodiments, examples of which are illustrated in the accompanying drawings. Where the following description refers to the accompanying drawings, like numbers in different drawings indicate the same or similar elements, unless otherwise indicated. The embodiments described in the following illustrative examples do not represent all embodiments consistent with the embodiments of the present disclosure. Rather, they are merely examples of apparatuses and methods consistent with some aspects of the present disclosure as detailed in the appended claims.

It should be noted that a plurality of steps may be included in one embodiment of the present disclosure. For ease of description, these steps are numbered. However, these numbers do not define an execution time slot and execution order between steps. Instead, these steps may be performed in any order and are not limited by the the disclosed embodiments.

In the description of the present application, the words "first", "second", "third", and the like are used to distinguish only and are not to be construed as indicating or implying relative importance or order. "A plurality of" means two or more.

"And/or", describing an associated relationship of associated objects, indicates that three relationships may exist, for example, A and/or B, may indicate that there are three cases of A alone, A and B together, and B alone.

In R18 LP WUS, if one WUS corresponds to one or more consecutive POs, and the one or more POs are in one or more consecutive DRX periods and correspond to the same or different UEs.

Figure 1:
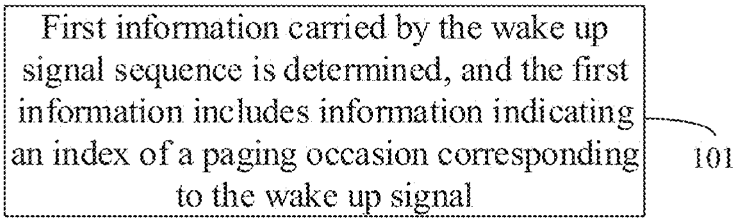
FIG. 1 is a flow chart of a method for determining a wake up signal sequence according to an exemplary embodiment.

Embodiments of the present disclosure provide a method for determining a wake up signal sequence, which is applied to a user equipment. FIG. 1 is a flow chart of a method for determining a wake up signal sequence according to an example, as shown in FIG. 1, the method includes step 101.

Step 101, first information carried by the wake up signal sequence is determined, and the first information includes information indicating an index of a paging occasion corresponding to the wake up signal.

In an embodiment, after receiving the wake up signal sequence, the user equipment determines the first information carried in the wake up signal sequence, the first information including information indicating an index of a paging occasion corresponding to the wake up signal.

The first information refers to a kind of information, and "first" herein does not imply a limitation on the order of occurrence or importance of the kind of information.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of one paging occasion of the plurality of paging occasions corresponding to the wake up signal.

In an embodiment, after receiving the wake up signal sequence, the user equipment determines first information carried in the wake up signal sequence, and in a scenario where the wake up signal corresponds to a plurality of paging occasions, the first information includes information indicating an index of one of the plurality of paging occasions corresponding to the wake up signal. Namely, in this scenario, the user equipment can determine a paging occasion corresponding to the wake up signal based on the first information so as to judge whether the wake up signal is a wake up signal of the present UE.

In an embodiment, after receiving the wake up signal sequence, the user equipment determines first information carried in the wake up signal sequence, and in a scenario where the wake up signal corresponds to a plurality of paging occasions, the first information includes information indicating an index of a first paging occasion of the plurality of paging occasions corresponding to the wake up signal.

In an embodiment, after receiving the wake up signal sequence, the user equipment determines first information carried in the wake up signal sequence, and in a scenario where the wake up signal corresponds to a plurality of paging occasions, the first information includes information indicating an index of a last paging occasion in the plurality of paging occasions corresponding to the wake up signal.

In an embodiment, the user equipment determines that the wake up signal corresponds to a plurality of paging occasions based on system configuration information received from a network equipment. In an embodiment, the user equipment determines that the wake up signal corresponds to a plurality of paging occasions based on an agreement of the communication protocol.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of a first paging occasion of the plurality of paging occasions corresponding to the wake up signal.

In an embodiment, after receiving the wake up signal sequence, the user equipment determines first information carried in the wake up signal sequence, and in a scenario where the wake up signal corresponds to a plurality of paging occasions, the first information includes information indicating an index of a first paging occasion of the plurality of paging occasions corresponding to the wake up signal. Namely, in this scenario, the user equipment can determine a paging occasion corresponding to the wake up signal based on the first information so as to judge whether the wake up signal is a wake up signal of the present UE.

In an embodiment, the user equipment determines that the wake up signal corresponds to a plurality of paging occasions based on system configuration information received from the network equipment. In an embodiment, the user equipment determines that the wake up signal corresponds to a plurality of paging occasions based on an agreement of the communication protocol.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of a first paging occasion of the plurality of paging occasions corresponding to the wake up signal;

and, in response to $N_{WUS\text{-}PO}$ being less than or equal to $N_s$ and $N_{WUS\text{-}PO}$ being a factor of $N_s$, the index of the first paging occasion of the plurality of paging occasions is:

$$i\_s - i\_s \bmod N_{WUS-PO};$$

where, the $N_{WUS\text{-}PO}$ is a number of the paging occasions corresponding to the wake up signal, the $N_s$ is a number of paging occasions included in one paging frame in a paging cycle of the user equipment, the i_s is an index of the paging occasion corresponding to the user equipment, and the $N_{WUS\text{-}PO}$ and the $N_s$ are both positive integers greater than or equal to 1.

In an embodiment, after receiving the wake up signal sequence, the user equipment determines first information carried in the wake up signal sequence, and in a scenario where the wake up signal corresponds to a plurality of paging occasions, the first information includes information indicating an index of a first paging occasion of the plurality of paging occasions corresponding to the wake up signal. In the case where the number $N_{WUS\text{-}PO}$ of the paging occasions corresponding to the wake up signal is less than or equal to the number $N_s$ of the paging occasions included in one paging frame in the paging cycle of the user equipment, and the $N_{WUS\text{-}PO}$ is a factor of the $N_s$, that is to say, in the case where the wake up signal corresponds to one paging frame, the index of the first paging occasion of the plurality of paging occasions can be obtained by calculation according to the following formula:

$$i\_s - i\_s \bmod N_{WUS-PO};$$

where, the $N_{WUS\text{-}PO}$ is the number of the paging occasions corresponding to the wake up signal, the $N_s$ is the number of paging occasions included in one paging frame in a paging cycle of the user equipment, the i_s is an index of the paging occasion corresponding to the user equipment, and the $N_{WUS\text{-}PO}$ and the $N_s$ are both positive integers greater than or equal to 1.

The user equipment determines the paging occasion corresponding to the wake up signal by calculating the first paging occasion of the plurality of paging occasions corresponding to the wake up signal through the above-mentioned formula so as to judge whether the wake up signal is a wake up signal corresponding to the present user equipment.

In an embodiment, the user equipment determines a value of the $N_{WUS\text{-}PO}$ based on system configuration information received from a network equipment. In an embodiment, the user equipment determines the value of the $N_{WUS\text{-}PO}$ based on an agreement of the communication protocol. In an embodiment, the user equipment determines a value of the $N_s$ based on the system configuration information received from the network equipment. In an embodiment, the user equipment determines a value of i_s based on the system configuration information received from the network equipment and a UE_ID of the user equipment itself.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of a first paging occasion of the plurality of paging occasions corresponding to the wake up signal;

and, in response to $N_{WUS\text{-}PO}$ being greater than $N_s$ and the $N_{WUS\text{-}PO}$ being an integer multiple of the $N_s$, the index of the first paging occasion of the plurality of paging occasions is 0;

where, the $N_{WUS\text{-}PO}$ is a number of paging occasions corresponding to the wake up signal, the $N_s$ is a number of the paging occasions included in one paging frame in a paging cycle of the user equipment, the $N_{WUS\text{-}PO}$ and the $N_s$ are both positive integers greater than or equal to 1.

In an embodiment, after receiving the wake up signal sequence, the user equipment determines first information carried in the wake up signal sequence, and in a scenario where the wake up signal corresponds to a plurality of paging occasions, the first information includes information indicating an index of a first paging occasion of the plurality of paging occasions corresponding to the wake up signal. In the case where the number $N_{WUS\text{-}PO}$ of the paging occasions corresponding to the wake up signal is greater than the number $N_s$ of the paging occasions included in one paging frame in the paging cycle of the user equipment and the $N_{WUS\text{-}PO}$ is an integer multiple of the $N_s$, the index of the first paging occasion in the plurality of paging occasions is 0.

The user equipment determines a paging occasion corresponding to the wake up signal through a first paging occasion of a plurality of paging occasions corresponding to the wake up signal so as to judge whether the wake up signal is a wake up signal corresponding to the present user equipment.

In an embodiment, the user equipment determines the value of $N_{WUS\text{-}PO}$ based on system configuration information received from the network equipment. In an embodiment, the user equipment determines the value of $N_{WUS\text{-}PO}$ based on an agreement of the communication protocol. In an embodiment, the user equipment determines the value of $N_s$ based on system configuration information received from the network equipment.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

determining first information carried by the wake up signal sequence, where the first information includes information indicating an index of a paging occasion corresponding to the wake up signal;

and the first information includes information indicating a system frame number of a paging frame, where a paging occasion corresponding to the wake up signal corresponds to the paging frame.

In an embodiment, after receiving the wake up signal sequence, the user equipment determines first information carried in the wake up signal sequence, the first information including information indicating an index of a paging occasion corresponding to the wake up signal and information indicating a system frame number of a paging frame. Wherein the paging occasion corresponding to the wake up signal corresponds to the above-mentioned paging frame. That is, the first information includes information indicating a system frame number of a paging frame corresponding to the paging occasion, in addition to information indicating an index of the paging occasion.

Note that there is a plurality of paging frames in a paging cycle of a UE, and one paging frame corresponds to a plurality of paging occasions.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of one paging occasion of the plurality of paging occasions corresponding to the wake up signal;

and, in response to that the plurality of paging occasions corresponding to the wake up signal correspond to a plurality of paging frames, the first information includes information indicating a system frame number of one paging frame of the plurality of paging frames.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of one paging occasion of the plurality of paging occasions corresponding to the wake up signal and information indicating a system frame number of one paging frame of the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, the user equipment determines that the wake up signal corresponds to a plurality of paging occasions and the paging occasions correspond to a plurality of paging frames based on system configuration information received from the network equipment. In an embodiment, the user equipment determines that the wake up signal corresponds to a plurality of paging occasions based on an agreement of the communication protocol.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of one paging occasion of the plurality of paging occasions corresponding to the wake up signal and information indicating a system frame number of a first paging frame of the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of one paging occasion of the plurality of paging occasions corresponding to the wake up signal and information indicating a system frame number of a last paging frame of the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of one paging occasion of the plurality of paging occasions corresponding to the wake up signal and information indicating a system frame number of a first paging frame of the plurality of paging frames corresponding to the paging occasion. In the case where a number $N_{WUS\text{-}PO}$ of the paging occasions corresponding to the wake up signal is greater than a number $N_s$ of the paging occasions included in one paging frame in the paging cycle of the user equipment and $N_{WUS\text{-}PO}$ is an integer multiple of $N_s$, the system frame number of the first paging frame can be calculated as follows:

$$SFN_{UE} - \left\lfloor \frac{i_{PO}}{N_s} \right\rfloor \times \frac{T}{N};$$

where the $i_{PO}$ represents a relative index value of a paging occasion monitored by a user equipment in a plurality of paging occasions corresponding to a wake up signal monitored by the user equipment, and the $i_{PO}$ counting starts from 0. The $i_{PO}$ is calculated by:

$$i_{PO} = ((\text{UE\_ID} \bmod N) \times N_s + \text{i\_s}) \bmod N_{WUS-PO};$$

where the $SFN_{UE}$ is a system frame number of a paging frame corresponding to the user equipment, the i_s is an index of the paging occasion corresponding to the user equipment, the T is duration of a paging cycle of the user equipment, the N is a number of paging frames in the paging cycle, and the UE_ID is a sequence number used for identifying the user equipment.

In an embodiment, the user equipment determines a value of the $N_{WUS\text{-}PO}$ based on system configuration information received from a network equipment. In an embodiment, the user equipment determines a value of the $N_{WUS\text{-}PO}$ based on an agreement of the communication protocol. In an embodiment, the user equipment determines a value of the $N_s$ based on system configuration information received from the network equipment. In an embodiment, the user equipment determines a value of the i_s based on the system configuration information received from the network equipment and a UE_ID of the user equipment itself. In an embodiment, the user equipment determines a value of the $SFN_{UE}$ based on the system configuration information received from the network equipment and the UE_ID of the user equipment itself.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

first information carried by the wake up signal sequence is determined, and in response to the wake up signal corresponding to a plurality of paging occasions, the first information includes information indicating an index of a first paging occasion of the plurality of paging occasions corresponding to the wake up signal;

and, in response to that the plurality of paging occasions corresponding to the wake up signal correspond to a plurality of paging frames, the first information includes information indicating a system frame number of one paging frame of the plurality of paging frames.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of a first paging occasion of the plurality of paging occasions corresponding to the wake up signal and information indicating a system frame number of one of the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, the user equipment determines that the wake up signal corresponds to a plurality of paging occasions and the plurality of paging occasions correspond to a plurality of paging frames based on system configuration information received from the network equipment. In an embodiment, the user equipment determines that the wake up signal corresponds to a plurality of paging occasions based on an agreement of the communication protocol.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of a first paging occasion of the plurality of paging occasions corresponding to the wake up signal and information indicating a system frame number of the first paging frame of the plurality of paging frames corresponding to the paging occasions. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, and in a scenario where the wake up signal corresponds to a plurality of paging occasions and the plurality of paging occasions corresponding to the wake up signal correspond to a plurality of paging frames, the first information includes information indicating an index of a first paging occasion of the plurality of paging occasions corresponding to the wake up signal and information indicating a system frame number of a last one of the plurality of paging frames corresponding to the paging occasions. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, and in a scenario where the wake up signal corresponds to a plurality of paging occasions and the plurality of the paging occasions corresponding to the wake up signal correspond to a plurality of paging frames, the first information includes information indicating an index of a first paging occasion of the plurality of paging occasions corresponding to the wake up signal and information indicating a system frame number of the first one of the plurality of paging frames corresponding to the paging occasions. In the case where the number $N_{WUS\text{-}PO}$ of the paging occasions corresponding to the wake up signal is greater than the number $N_s$ of the paging occasions included in one paging frame in the paging cycle of the user equipment, and the $N_{WUS\text{-}PO}$ is an integer multiple of the $N_s$, the index of the first paging occasion in the multiple paging occasions is 0, and the system frame number of the first paging frame can be calculated by the following formula:

$$SFN_{UE} - \left\lfloor \frac{i_{PO}}{N_s} \right\rfloor \times \frac{T}{N};$$

where the $i_{PO}$ represents a relative index value of a paging occasion monitored by a user equipment in a plurality of paging occasions corresponding to a wake up signal monitored by the user equipment, and the $i_{PO}$ counting starts from 0. The $i_{PO}$ is calculated by:

$$i_{PO} = ((\text{UE\_ID} \bmod N) \times N_s + \text{i\_s}) \bmod N_{WUS-PO};$$

where the $SFN_{UE}$ is a system frame number of a paging frame corresponding to the user equipment, the i_s is an index of the paging occasion corresponding to the user equipment, the T is the duration of a paging cycle of the user equipment, the N is the number of paging frames in the paging cycle, and the UE_ID is a sequence number used for identifying the user equipment.

In an embodiment, the user equipment determines a value of the $N_{WUS\text{-}PO}$ based on system configuration information received from the network equipment. In an embodiment, the user equipment determines a value of the $N_{WUS\text{-}PO}$ based on an agreement of the communication protocol. In an embodiment, the user equipment determines a value of the $N_s$ based on system configuration information received from the network equipment. In an embodiment, the user equipment determines a value of the i_s based on the system configuration information received from the network equipment and a UE_ID of the user equipment itself. In an embodiment, the user equipment determines the value of the $SFN_{UE}$ based on the system configuration information received from the network equipment and a UE_ID of the user equipment itself.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

determining first information carried by the wake up signal sequence, where the first information includes information indicating an index of a paging occasion corresponding to the wake up signal;

and, in response to that the plurality of paging occasions corresponding to the wake up signal correspond to a plurality of paging frames, the first information includes information indicating a system frame number of one paging frame of the plurality of paging frames.

In an embodiment, after receiving the wake up signal sequence, the user equipment determines first information carried in the wake up signal sequence, the first information including information indicating an index of a paging occasion corresponding to the wake up signal, and in a scenario where the paging occasion corresponding to the wake up signal corresponds to a plurality of paging frames, the first information further includes information indicating a system frame number of a paging frame in the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, the user equipment determines that the paging occasions correspond to a plurality of paging frames based on system configuration information received from the network equipment.

In an embodiment, after receiving the wake up signal sequence, the user equipment determines first information carried in the wake up signal sequence, where the first information includes information indicating an index of a paging occasion corresponding to the wake up signal, and in a scenario where the paging occasion corresponding to the wake up signal corresponds to a plurality of paging frames, the first information further includes information indicating a system frame number of a first one of the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, the first information including information indicating an index of a paging occasion corresponding to the wake up signal, and in a scenario where the paging occasion corresponding to the wake up signal corresponds to a plurality of paging frames, the first information further including information indicating a system frame number of a last paging frame in the plurality of paging frames corresponding to the paging occasion. The user equipment may determine a paging occasion corresponding to the wake up signal based on the above-mentioned first information so as to judge whether the wake up signal is a wake up signal corresponding to the present UE.

In an embodiment, after receiving the wake up signal sequence, the user equipment determines first information carried in the wake up signal sequence, where the first information includes information indicating an index of a paging occasion corresponding to the wake up signal, and in a scenario where the paging occasion corresponding to the wake up signal corresponds to a plurality of paging frames, the first information further includes information indicating a system frame number of a first paging frame of the plurality of paging frames corresponding to the paging occasion. In the case where the number of the paging occasions $N_{WUS\text{-}PO}$ corresponding to the wake up signal is greater than the number of the paging occasions $N_s$ included in one paging frame in the paging cycle of the user equipment and the $N_{WUS\text{-}PO}$ is an integer multiple of the $N_s$, the system frame number of the first paging frame can be calculated as follows:

$$SFN_{UE} - \left\lfloor \frac{i_{PO}}{N_s} \right\rfloor \times \frac{T}{N};$$

where the $i_{PO}$ represents a relative index value of a paging occasion monitored by a user equipment in a plurality of paging occasions corresponding to a wake up signal monitored by the user equipment, and the $i_{PO}$ counting starts from 0. The $i_{PO}$ is calculated by:

$$i_{PO} = ((\text{UE\_ID} \bmod N) \times N_s + \text{i\_s}) \bmod N_{WUS\text{-}PO};$$

where the $SFN_{UE}$ is a system frame number of a paging frame corresponding to the user equipment, the is i_s an index of the paging occasion corresponding to the user equipment, the T is duration of a paging cycle of the user equipment, the N is a number of paging frames in the paging cycle, and UE_ID is a sequence number used for identifying the user equipment.

In an embodiment, the user equipment determines a value of $N_{WUS\text{-}PO}$ based on system configuration information received from the network equipment. In an embodiment, the user equipment determines the value of the $N_{WUS\text{-}PO}$ based on an agreement of the communication protocol. In an embodiment, the user equipment determines a value of $N_s$ based on system configuration information received from the network equipment. In an embodiment, the user equipment determines a value of i_s based on the system configuration information received from the network equipment and a UE_ID of the user equipment itself. In an embodiment, the user equipment determines a value of $SFN_{UE}$ based on the system configuration information received from the network equipment and a UE_ID of the user equipment itself.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Embodiments of the present disclosure provide a method for determining a wake up signal sequence, which is performed by a user equipment. The method includes:

determining first information carried by the wake up signal sequence, where the first information includes information indicating an index of a paging occasion corresponding to the wake up signal;

and, $N_{WUS-PO}$ is a factor or integer multiple of $N_s$, where, the $N_{WUS-PO}$ is a number of the paging occasions corresponding to the wake up signal, the $N_S$ is a number of the paging occasions included in one paging frame in a paging cycle of the user equipment, and the $N_{WUS-PO}$ and the $N_s$ are both positive integers greater than or equal to 1.

In an embodiment, after receiving the wake up signal sequence, the user equipment determines first information carried in the wake up signal sequence, the first information including information indicating an index of a paging occasion corresponding to the wake up signal. The number of the paging occasions $N_{WUS-PO}$ corresponding to the wake up signal is a factor of the number of the paging occasions $N_s$ included in one paging frame in the paging cycle of the user equipment.

In an embodiment, after receiving the wake up signal sequence, the user equipment determines first information carried in the wake up signal sequence, the first information including information indicating an index of a paging occasion corresponding to the wake up signal. The number of the paging occasions $N_{WUS-PO}$ corresponding to the wake up signal is an integer multiple of the number of the paging occasions $N_s$ included in one paging frame in the paging cycle of the user equipment.

In an embodiment, the user equipment determines the value of the $N_{WUS-PO}$ based on system configuration information received from the network equipment. In an embodiment, the user equipment determines the value of the $N_{WUS-PO}$ based on an agreement of the communication protocol. In an embodiment, the user equipment determines the value of the $N_s$ based on system configuration information received from the network equipment.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Figure 2:
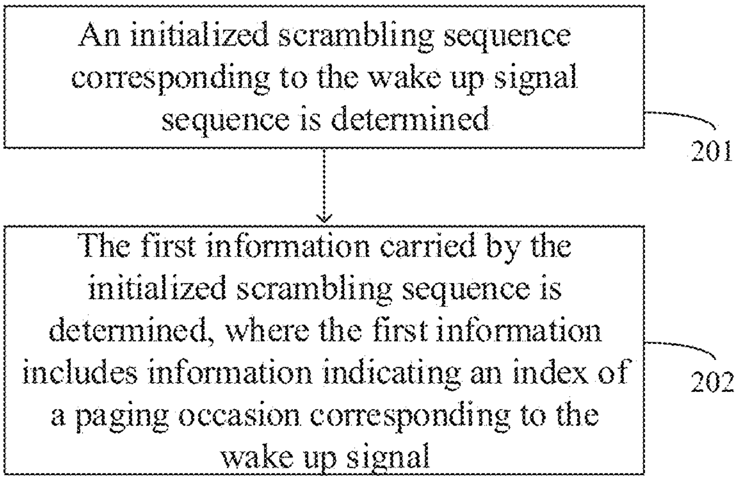
FIG. 2 is a flow chart of a method for determining a wake up signal sequence according to an exemplary embodiment.

Embodiments of the present disclosure provide a method for determining a wake up signal sequence, which is performed by a user equipment. FIG. 2 is a flow chart of a method for determining a wake up signal sequence according to an example, as shown in FIG. 2, the method including steps 201 to 202.

Step 201, an initialized scrambling sequence corresponding to the wake up signal sequence is determined.

Step 202, the first information carried by the initialized scrambling sequence is determined, where the first information includes information indicating an index of a paging occasion corresponding to the wake up signal.

It is known to a person skilled in the art that a wake up signal sequence can be determined on the basis of an initialized scrambling sequence, and based on this, user equipment can also determine an initialized scrambling sequence corresponding thereto on the basis of the wake up signal sequence, and the specific determination method can be based on a corresponding relationship between the wake up signal sequence and the initialized scrambling sequence known to a person skilled in the art, which will not be described in detail herein.

In an embodiment, after receiving the wake up signal sequence, the user equipment determines an initialized scrambling sequence corresponding to the wake up signal based on the above-mentioned corresponding relationship between the wake up signal sequence and the initialized scrambling sequence. Further first information carried by the initialized scrambling sequence is determined, the first information including information indicating an index of a paging occasion corresponding to the wake up signal.

In an embodiment, after receiving the wake up signal sequence, the user equipment determines an initialized scrambling sequence corresponding to the wake up signal based on the above-mentioned corresponding relationship between the wake up signal sequence and the initialized scrambling sequence. Further first information carried by the initialized scrambling sequence is determined, the first information including information indicating an index of a paging occasion corresponding to the wake up signal. The first information further includes information indicating a system frame number of a paging frame, and the paging occasion corresponding to the wake up signal corresponds to the above-mentioned paging frame.

In the above-mentioned embodiment, the user equipment can determine a paging occasion corresponding to the wake up signal according to the wake up signal, so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

Figure 3:
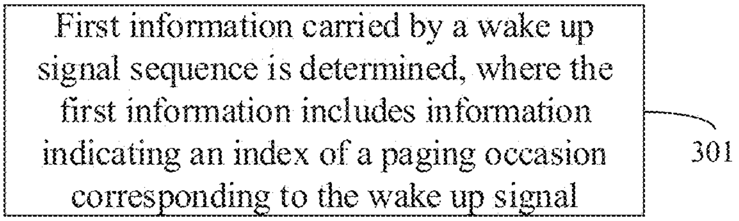
FIG. 3 is a flow chart of a method for determining a wake up signal sequence according to an exemplary embodiment.

Embodiments of the present disclosure provide a method for determining a wake up signal sequence which is performed by a network equipment. FIG. 3 is a flow chart of a method for determining a wake up signal sequence according to an example, as shown in FIG. 3, the method including step 301.

Step 301, first information carried by a wake up signal sequence is determined, where the first information including information indicating an index of a paging occasion corresponding to the wake up signal.

In an embodiment, the network equipment determines first information carried by the wake up signal sequence, the first information including information indicating an index of paging occasions corresponding to the wake up signal. The network equipment generates a wake up signal sequence based on the first information and sends the generated wake up signal sequence to the user equipment.

In the above embodiment, the network equipment determines information indicating an index of paging occasions corresponding to the wake up signal and carries the information in the generated wake up signal sequence. The user equipment can determine a paging occasion corresponding to the wake up signal according to the wake up signal, so that in the case where there are a plurality of paging occasions corresponding to wake signals and the monitoring periods of wake up signals overlap, the user equipment can accurately distinguish whether the received wake up signal corresponds to the paging occasion corresponding to the present user equipment.

Embodiments of the present disclosure provide a method for determining a wake up signal sequence which is performed by a network equipment. The method includes:

first information carried by a wake up signal sequence is determined, and in response to the wake up signal corresponding to a plurality of paging occasions, the first information includes information indicating an index of one paging occasion of the plurality of paging occasions corresponding to the wake up signal.

In an embodiment, the network equipment determines first information carried by the wake up signal sequence, and in a scenario where the wake up signal corresponds to a plurality of paging occasions, the first information includes information indicating an index of one of the plurality of paging occasions corresponding to the wake up signal. The network equipment generates a wake up signal sequence based on the first information and sends the generated wake up signal sequence to the user equipment.

In an embodiment, the network equipment determines first information carried by the wake up signal sequence, and in a scenario where the wake up signal corresponds to a plurality of paging occasions, the first information includes information indicating an index of a first paging occasion of the plurality of paging occasions corresponding to the wake up signal. The network equipment generates a wake up signal sequence based on the first information and sends the generated wake up signal sequence to the user equipment.

In an embodiment, the network equipment determines first information carried by the wake up signal sequence, and in a scenario where the wake up signal corresponds to a plurality of paging occasions, the first information includes information indicating an index of a first paging occasion of the plurality of paging occasions corresponding to the wake up signal. In the case where the number of the paging occasions $N_{WUS\text{-}PO}$ corresponding to the wake up signal is less than or equal to the number of the paging occasions $N_s$ included in one paging frame in the paging cycle of the user equipment, and the $N_{WUS\text{-}PO}$ is a factor of the $N_s$, that is to say, in the case where the wake up signal corresponds to one paging frame, the index of the first paging occasion of the plurality of paging occasions can be obtained by calculation according to the following formula:

$$i\_s - i\_s \bmod N_{WUS\text{-}PO};$$

where the $N_{WUS\text{-}PO}$ is the number of the paging occasions corresponding to the wake up signal, the $N_s$ is the number of paging occasions included in one paging frame in a paging cycle of the user equipment, the i_s is an index of the paging occasion corresponding to the user equipment, and the $N_{WUS\text{-}PO}$ and the $N_s$ are both positive integers greater than or equal to 1.

In the case where the number of the paging occasions $N_{WUS\text{-}PO}$ corresponding to the wake up signal is greater than the number of the paging occasions $N_s$ included in one paging frame in the paging cycle of the user equipment, and the $N_{WUS\text{-}PO}$ is an integer multiple of the $N_s$, the index of the first paging occasion in the plurality of paging occasions is 0.

In an embodiment, the user equipment determines the value of $N_{WUS\text{-}PO}$ based on system configuration information received from the network equipment. In an embodiment, the user equipment determines the value of $N_{WUS\text{-}PO}$ based on an agreement of the communication protocol. In an embodiment, the user equipment determines the value of $N_s$ based on system configuration information received from the network equipment. In an embodiment, the user equipment determines the value of i_s based on the system configuration information received from the network equipment and a UE_ID of the user equipment itself.

In an embodiment, the number of the paging occasions $N_{WUS\text{-}PO}$ corresponding to the wake up signal is a factor of the number of the paging occasions $N_s$ included in one paging frame in the paging cycle of the user equipment.

In an embodiment, the number of the paging occasions $N_{WUS\text{-}PO}$ corresponding to the wake up signal is an integer multiple of the number of the paging occasions $N_s$ included in one paging frame in the paging cycle of the user equipment.

In the above embodiment, the network equipment determines information indicating an index of paging occasions corresponding to the wake up signal and carries the information in the generated wake up signal sequence. The user equipment can determine a paging occasion corresponding to the wake up signal according to the wake up signal so that in the case where there are a plurality of paging occasions corresponding to wake signals and the monitoring periods of wake up signals overlap, the user equipment can accurately distinguish whether the received wake up signal corresponds to the paging occasion corresponding to the present user equipment.

Embodiments of the present disclosure provide a method for determining a wake up signal sequence which is performed by a network equipment. The method includes:

determining first information carried by the wake up signal sequence, where the first information includes information indicating an index of a paging occasion corresponding to the wake up signal;

and the first information includes information indicating a system frame number of a paging frame, where a paging occasion corresponding to the wake up signal corresponds to the paging frame.

In an embodiment, network equipment determines first information carried by a wake up signal sequence, where the first information includes information indicating an index of a paging occasion corresponding to the wake up signal and information indicating a system frame number of a paging frame, and the paging occasion corresponding to the wake up signal corresponds to the above-mentioned paging frame. The network equipment generates a wake up signal sequence based on the first information and sends the generated wake up signal sequence to the user equipment.

In an embodiment, the network equipment determines first information carried by the wake up signal sequence, the first information including information indicating an index of paging occasions corresponding to the wake up signal. In the case where the paging occasion corresponding to the wake up signal corresponds to a plurality of paging frames, the first information further includes information indicating a system frame number of one of the plurality of paging frames. The network equipment generates a wake up signal sequence based on the first information and sends the generated wake up signal sequence to the user equipment.

In an embodiment, the network equipment determines first information carried by the wake up signal sequence, the first information including information indicating an index of paging occasions corresponding to the wake up signal. In the case where the paging occasion corresponding to the wake up signal corresponds to a plurality of paging frames, the first information further includes information indicating a system frame number of a first one of the plurality of paging frames. The network equipment generates a wake up signal sequence based on the first information and sends the generated wake up signal sequence to the user equipment.

In an embodiment, the network equipment determines first information carried by the wake up signal sequence, the first information including information indicating an index of paging occasions corresponding to the wake up signal. In the case where the paging occasion corresponding to the wake up signal corresponds to a plurality of paging frames, the first information further includes information indicating a system frame number of a first one of the plurality of paging frames. In the case where the number of the paging occasions $N_{WUS\text{-}PO}$ corresponding to the wake up signal is greater than the number of the paging occasions $N_s$ included in one paging frame in the paging cycle of the user equipment and the $N_{WUS\text{-}PO}$ is an integer multiple of the $N_s$, the system frame number of the first paging frame can be calculated as follows:

$$SFN_{UE} - \left\lfloor \frac{i_{PO}}{N_s} \right\rfloor \times \frac{T}{N};$$

where the $i_{PO}$ represents a relative index value of a paging occasion monitored by a user equipment in a plurality of paging occasions corresponding to a wake up signal monitored by the user equipment, and the $i_{PO}$ counting starts from 0. The $i_{PO}$ is calculated by:

$$i_{PO} = ((\text{UE\_ID} \bmod N) \times N_s + \text{i\_s}) \bmod N_{WUS-PO};$$

where the $SFN_{UE}$ is a system frame number of a paging frame corresponding to the user equipment, the is i_s an index of the paging occasion corresponding to the user equipment, the T is duration of a paging cycle of the user equipment, the N is the number of paging frames in the paging cycle, and the UE_ID is a sequence number used for identifying the user equipment.

In an embodiment, the user equipment determines the value of the $N_{WUS\text{-}PO}$ based on system configuration information received from the network equipment. In an embodiment, the user equipment determines the value of the $N_{WUS\text{-}PO}$ based on an agreement of the communication protocol. In an embodiment, the user equipment determines the value of the $N_S$ based on system configuration information received from the network equipment. In an embodiment, the user equipment determines the value of the i_s based on the system configuration information received from the network equipment and its own UE_ID. In an embodiment, the user equipment determines the value of the $SFN_{UE}$ based on the system configuration information received from the network equipment and its own UE_ID.

In the above embodiment, the network equipment determines information indicating an index of paging occasions corresponding to the wake up signal and carries the information in the generated wake up signal sequence. The user equipment can determine a paging occasion corresponding to the wake up signal according to the wake up signal, so that in the case where there are a plurality of paging occasions corresponding to wake signals and the monitoring periods of wake up signals overlap, the user equipment can accurately distinguish whether the received wake up signal corresponds to the paging occasion corresponding to the present user equipment.

Embodiments of the present disclosure provide a method for determining a wake up signal sequence which is performed by a network equipment. The method includes:

determining first information carried by an initialized scrambling sequence corresponding to a wake up signal sequence, where the first information includes information indicating an index of a paging occasion corresponding to the wake up signal.

In an embodiment, the network equipment determines first information carried by an initialized scrambling sequence corresponding to the wake up signal sequence, the first information including information indicating an index of a paging occasion corresponding to the wake up signal. The network equipment generates a wake up signal sequence based on the first information and sends the generated wake up signal sequence to the user equipment.

The corresponding relationship between the wake up signal sequence and the initial scrambling sequence known to those skilled in the art is not described in detail herein.

In the above embodiment, the network equipment determines information indicating an index of paging occasions corresponding to the wake up signal and carries the information in the generated wake up signal sequence. The user equipment can determine a paging occasion corresponding to the wake up signal according to the wake up signal, so that in the case where there are a plurality of paging occasions corresponding to wake signals and the monitoring periods of wake up signals overlap, the user equipment can accurately distinguish whether the received wake up signal corresponds to the paging occasion corresponding to the present user equipment.

Figure 4:
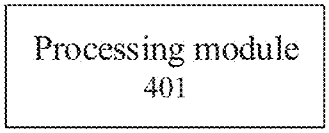
FIG. 4 is a block diagram of an apparatus for determining a wake up signal sequence according to an exemplary embodiment.

An embodiment of the present disclosure provides an apparatus for determining a wake up signal sequence, applied to the user equipment, as shown in FIG. 4, including:

a processing module 401 configured to determine first information carried by a wake up signal sequence, the first information including information indicating an index of a paging occasion corresponding to the wake up signal.

The disclosed embodiments provide an apparatus for determining a wake up signal sequence, as applied to network equipment, including:

a processing module, configured to determine first information carried by a wake up signal sequence, the first information including information indicating an index of a paging occasion corresponding to the wake up signal.

The disclosed embodiments provide a mobile terminal, including:

a processor;

a memory, for storing processor-executable instructions;

wherein the processor is configured to execute executable instructions in the memory to implement the steps of the method for determining a wake up signal sequence described above.

The disclosed embodiment provides network-side equipment, including:

a processor;

a memory, for storing processor-executable instructions;

wherein the processor is configured to execute executable instructions in the memory to implement the steps of the method for determining a wake up signal sequence described above.

The disclosed embodiments provide a non-transitory computer-readable storage medium having stored thereon executable instructions that, when executed by a processor, perform the above-described steps of determining a wake up signal sequence.

Figure 5:
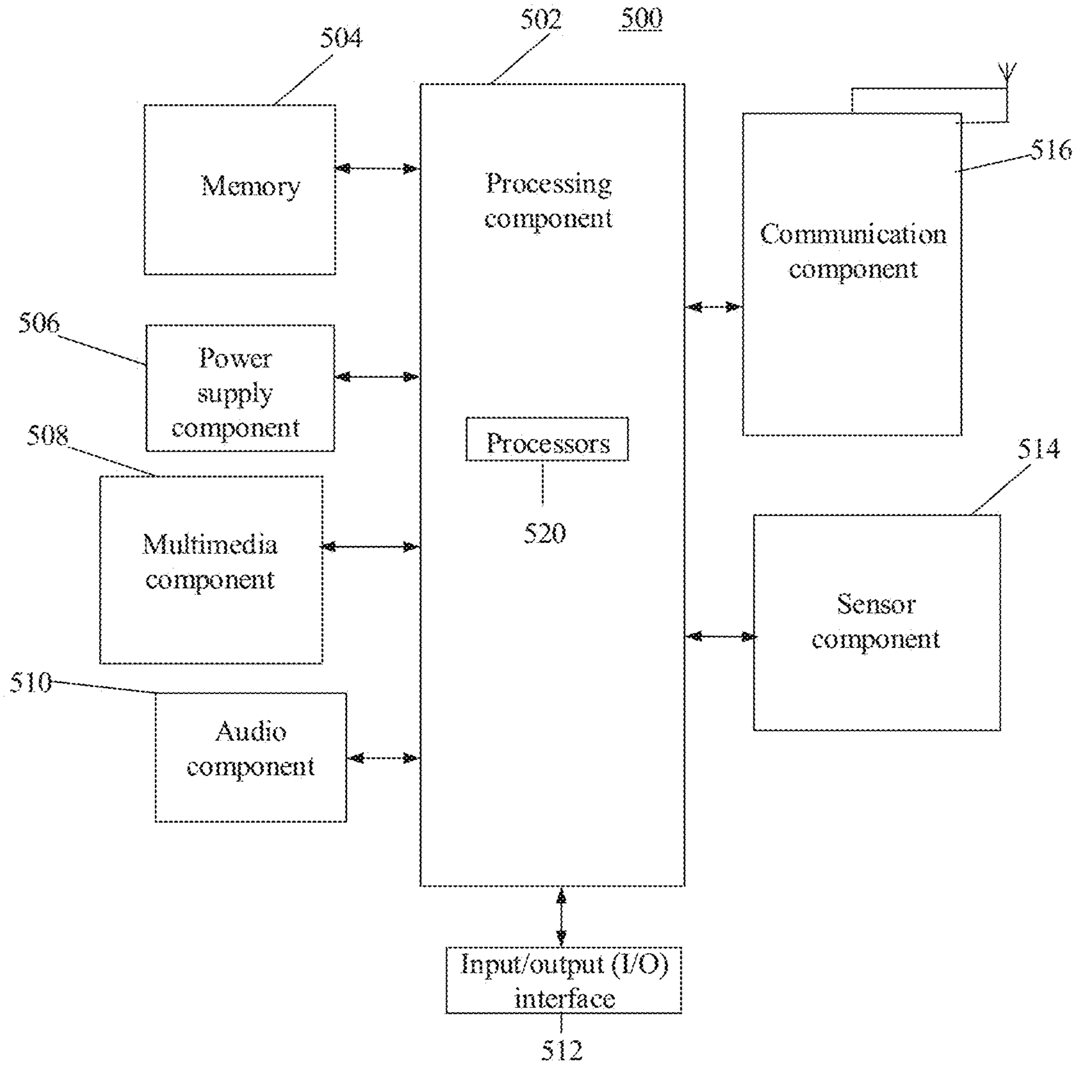
FIG. 5 is a block diagram of an apparatus for determining a wake up signal sequence according to an exemplary embodiment.

FIG. 5 is a block diagram of a device 500 for determining a wake up signal sequence according to an example. For example, the device 500 may be a mobile phone, a computer, a digital broadcast terminal, a messaging device, a game console, a tablet device, a medical device, an exercise device, a personal digital assistant, etc.

Referring to FIG. 5, device 500 may include one or more of the following components: processing component 502, memory 504, power supply component 506, multimedia component 508, audio component 510, input/output (I/O) interface 512, sensor component 514, and communication component 516.

The processing component 502 generally controls the overall operation of the device 500, such as operations associated with display, telephone calls, data communications, camera operations, and recording operations. The processing component 502 can include one or more processors 520 to execute instructions to perform all or part of the steps of the methods described above. In addition, the processing component 502 can include one or more modules to facilitate interaction between the processing component 502 and other components. For example, the processing component 502 can include a multimedia module to facilitate interaction between the multimedia component 508 and the processing component 502.

Memory 504 is configured to store various types of data to support operation at equipment 500. Examples of such data include instructions for any application or method operating on device 500, contact data, phonebook data, messages, pictures, videos, etc. The memory 504 may be implemented by any type or combination of volatile or non-volatile memory devices, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disks.

Power supply component 506 provides power to the various components of device 500. Power supply component 506 can include a power management system, one or more power sources, and other components associated with generating, managing, and distributing power for device 500.

The multimedia component 508 includes a screen that provides an output interface between the device 500 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, slides, and gestures on the touch panel. The touch sensor may not only sense the boundary of a touch or slide action but also detect the duration and pressure associated with the touch or slide operation. In some embodiments, the multimedia component 508 includes a front camera and/or a rear camera. When the equipment 500 is in an operating mode, such as a shooting mode or a video mode, the front camera and/or the rear camera may receive external multimedia data. Each of the front camera and the rear camera may be a fixed optical lens system or have a focal length and an optical zoom capability.

The audio component 510 is configured to output and/or input audio signals. For example, the audio component 510 includes a MIC configured to receive external audio signals when the device 500 is in an operational mode, such as a call mode, a recording mode, and a voice recognition mode. The received audio signal may be further stored in memory 504 or transmitted via communication component 516. In some embodiments, the audio component 510 also includes a speaker for outputting audio signals.

The I/O interface 512 provides an interface between the processing component 502 and a peripheral interface module, which may be a keyboard, click wheel, button, etc. These buttons may include, but are not limited to: a home button, a volume button, a start button, and a lock button.

The sensor component 514 includes one or more sensors for providing status assessments of various aspects to the device 500. For example, the sensor component 514 may detect an on/off state of the device 500, a relative positioning of components, such as a display and keypad of the device 500, the sensor component 514 also can detect a change in position of the device 500 or a component of the device 500, the presence or absence of user contact with the device 500, an orientation or acceleration/deceleration of the device 500, and a temperature change of the device 500. The sensor component 514 may include a proximity sensor configured to detect the presence of a nearby object in the absence of any physical contact. The sensor component 514 may also include a light sensor, such as a CMOS or CCD image sensor, for use in imaging applications. In some embodiments, the sensor component 514 may also include an acceleration sensor, a gyroscope sensor, a magnetic sensor, a pressure sensor, or a temperature sensor.

The communication component 516 is configured to facilitate wired or wireless communication between the device 500 and other devices. The device 500 may access a wireless network based on a communication standard, such as WiFi, 2G, or 3G, or a combination thereof. In one example, the communication component 516 receives a broadcast signal or broadcast-related information from an external broadcast management system via a broadcast channel. In one example, the communication component 516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

In examples, device 500 may be implemented with one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the methods described above.

In an example, a non-transitory computer-readable storage medium including instructions, such as memory 504 including instructions, executable by processor 520 of device 500 to perform the method is also provided. For example, the non-transitory computer-readable storage medium may be a ROM, a random access memory (RAM), a CD-ROM, a magnetic tape, a floppy disk, an optical data storage device, etc.

Figure 6:
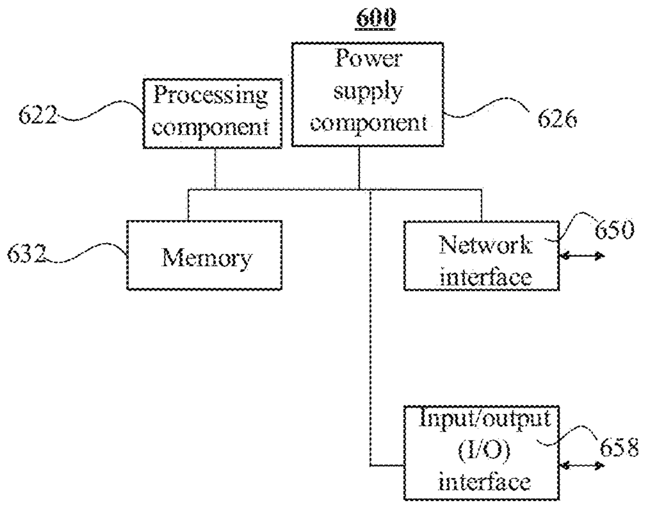
FIG. 6 is a block diagram of an apparatus for determining a wake up signal sequence according to an exemplary embodiment.

FIG. 6 is a block diagram of a device 600 for determining a wake up signal sequence according to an example. For example, device 600 can be provided as a base station. Referring to FIG. 6, device 600 includes a processing component 622 that further includes one or more processors and memory resources represented by memory 632 for storing instructions, such as applications, executable by processing component 622. The applications stored in memory 632 may include one or more modules each corresponding to a set of instructions. Further, the processing component 622 is configured to execute instructions to perform the above-described access method for the unlicensed channel.

The device 600 can also include a power supply component 626 configured to perform power supply management of the device 600, a wired or wireless network interface 650 configured to connect the device 600 to a network, and an input/output (I/O) interface 658. Device 600 may operate based on an operating system stored in memory 632, such as Windows Server™, Mac OS X™, Unix™, Linux™, FreeBSD™, or the like.

Other embodiments of the disclosed embodiments will be apparent to those skilled in the art from consideration of the specification and practice of the invention disclosed herein. This application is intended to cover any variations, uses, or adaptations of the disclosed embodiments following, in general, the principles of the disclosed embodiments and including such departures from the present disclosure as come within the known or customary practice in the art to which the disclosed embodiments pertains. It is intended that the specification and examples be considered as exemplary only, with a true scope and spirit of the disclosed embodiments being indicated by the following claims.

It is to be understood that the embodiments of the present disclosure are not limited to the precise arrangements described above and shown in the accompanying drawings and that various modifications and changes may be made without departing from the scope thereof. The scope of the disclosed embodiments is limited only by the following claims.

INDUSTRIAL APPLICABILITY

The user equipment can determine a paging occasion corresponding to the wake up signal according to the wake up signal so that in the case where there are a plurality of paging occasions corresponding to wake signals and the monitoring periods of the wake up signals overlap, the user equipment can accurately distinguish whether the received wake up signal corresponds to the paging occasion corresponding to the present user equipment.

The invention claimed is:

1. A method for determining a paging occasion, performed by a user equipment, comprising:

determining first information carried by a wake up signal, the first information comprising information indicating an index of a paging occasion corresponding to the wake up signal;

wherein in response to the wake up signal corresponding to a plurality of paging occasions, the first information comprises information indicating an index of one paging occasion of the plurality of paging occasions to which the wake up signal corresponds, and in response to that the plurality of paging occasions corresponding to the wake up signal correspond to a plurality of paging frames, the first information comprises information indicating a system frame number of one paging frame of the plurality of paging frames.

2. The method of claim 1, wherein in response to the wake up signal corresponding to a plurality of paging occasions, the first information comprises information indicating an index of a first paging occasion of the plurality of paging occasions to which the wake up signal corresponds.

3. The method of claim 2, wherein in response to $N_{WUS-PO}$ being less than or equal to $N_s$ and the $N_{WUS-PO}$ being a factor of the $N_s$, the index of the first paging occasion of the plurality of paging occasions is:

$$\text{i\_s} - \text{i\_s} \bmod N_{WUS-PO};$$

wherein, the $N_{WUS-PO}$ is a number of the plurality of paging occasions corresponding to the wake up signal, the $N_s$ is a number of one or more paging occasions comprised in one paging frame in a paging cycle of the user equipment, the i_s is an index of the paging occasion corresponding to the user equipment, and the $N_{WUS-PO}$ and the $N_s$ are both positive integers greater than or equal to 1.

4. The method of claim 2, wherein in response to $N_{WUS-PO}$ being greater than $N_s$ and the $N_{WUS-PO}$ being an integer multiple of the $N_s$, the index of the first paging occasion of the plurality of paging occasions is 0;

wherein, the $N_{WUS-PO}$ is a number of the plurality of paging occasions corresponding to the wake up signal, the $N_s$ is a number of the one or more paging occasions comprised in one paging frame in a paging cycle of the user equipment, the $N_{WUS-PO}$ and the $N_s$ are both positive integers greater than or equal to 1.

5. The method of claim 1, wherein the first information comprises information indicating a system frame number of a first paging frame of the plurality of paging frames.

6. The method of claim 5, wherein in response to $N_{WUS-PO}$ being greater than $N_s$ and the $N_{WUS-PO}$ being an integer multiple of the $N_s$, the system frame number of the first paging frame of the plurality of paging frames is:

$$SFN_{UE} - \left\lfloor \frac{i_{PO}}{N_s} \right\rfloor \times \frac{T}{N};$$

wherein, the $$i_{PO} = ((\text{UE\_ID} \bmod N) \times N_s + \text{i\_s}) \bmod N_{WUS-PO},$$

and the $SFN_{UE}$ is a system frame number of a paging frame corresponding to the user equipment, the $N_{WUS-PO}$ is a number of the paging occasions corresponding to the wake up signal, the $N_s$ is a number of one or more paging occasions comprised in one paging frame in a paging cycle of the user equipment, the i_s is an index of the paging occasion corresponding to the user equipment, the Tis duration of the paging cycle of the user equipment, the N is a number of one or more paging frames in the paging cycle, and the UE_ID is a serial number for identifying the user equipment, and the $N_{WUS-PO}$ and the $N_s$ are both positive integers greater than or equal to 1.

7. The method of claim 1, wherein $N_{WUS-PO}$ is a factor or integer multiple of $N_s$, wherein, the $N_{WUS-PO}$ is a number of the paging occasions corresponding to the wake up signal, the $N_s$ is a number of one or more paging occasions comprised in one paging frame in a paging cycle of the user equipment, and the $N_{WUS-PO}$ and the $N_s$ are both positive integers greater than or equal to 1.

8. The method of claim 1, wherein the determining first information carried by the wake up signal comprises:

determining an initialized scrambling sequence corresponding to the wake up signal; and determining the first information carried by the initialized scrambling sequence.

9. A mobile terminal, comprising:

a processor; and a memory, for storing processor-executable instructions;

wherein the processor is configured to:

determine first information carried by a wake up signal, the first information comprising information indicating an index of a paging occasion corresponding to the wake up signal;

wherein in response to the wake up signal corresponding to a plurality of paging occasions, the first information comprises information indicating an index of one paging occasion of the plurality of paging occasions to which the wake up signal corresponds, and in response to that the plurality of paging occasions corresponding to the wake up signal correspond to a plurality of paging frames, the first information comprises information indicating a system frame number of one paging frame of the plurality of paging frames.

10. The method of claim 3, further comprising:

in response to the index $$i\_s - i\_s \bmod N_{WUS-PO};$$

being consistent with the index of the first paging occasion indicated by the first information, determining that the wake up signal corresponds to the paging occasion of the user equipment.

11. The mobile terminal of claim 9, wherein in response to the wake up signal corresponding to a plurality of paging occasions, the first information comprises information indicating an index of a first paging occasion of the plurality of paging occasions to which the wake up signal corresponds.

12. The mobile terminal of claim 9, wherein in response to $N_{WUS-PO}$ being less than or equal to $N_s$ and the $N_{WUS-PO}$ being a factor of the $N_s$, the index of the first paging occasion of the plurality of paging occasions is:

$$i\_s - i\_s \bmod N_{WUS-PO};$$

wherein, the $N_{WUS-PO}$ is a number of the plurality of paging occasions corresponding to the wake up signal, the $N_s$ is a number of one or more paging occasions comprised in one paging frame in a paging cycle of the user equipment, the i_s is an index of the paging occasion corresponding to the user equipment, and the $N_{WUS-PO}$ and the $N_s$ are both positive integers greater than or equal to 1.

13. A method for determining a wake up signal, performed by a network equipment, comprising:

determining first information carried by the wake up signal, the first information comprising information indicating an index of a paging occasion corresponding to the wake up signal;

wherein in response to the wake up signal corresponding to a plurality of paging occasions, the first information comprises information indicating an index of one paging occasion of the plurality of paging occasions to which the wake up signal corresponds, and in response to that the plurality of paging occasions corresponding to the wake up signal correspond to a plurality of paging frames, the first information comprises information indicating a system frame number of one paging frame of the plurality of paging frames.

14. The method of claim 13, wherein in response to the wake up signal corresponding to a plurality of paging occasions, the first information comprises information indicating an index of a first paging occasion of the plurality of paging occasions to which the wake up signal corresponds.

15. The method of claim 14, wherein in response to $N_{WUS-PO}$ being less than or equal to $N_s$ and the $N_{WUS-PO}$ being a factor of the $N_s$, the index of the first paging occasion of the plurality of paging occasions is:

$$i\_s - i\_s \bmod N_{WUS-PO};$$

wherein, the $N_{WUS-PO}$ is a number of the plurality of paging occasions corresponding to the wake up signal, the $N_s$ is a number of one or more paging occasions comprised in one paging frame in a paging cycle of the user equipment, the i_s is an index of the paging occasion corresponding to the user equipment, and the $N_{WUS-PO}$ and the $N_s$ are both positive integers greater than or equal to 1.

* * * * *